Nov. 20, 1945.　　　　L. B. GRIFFITH　　　　2,389,357
SYSTEM OF SEWAGE CLARIFICATION AND SLUDGE REMOVAL
Filed Jan. 15, 1942　　　3 Sheets-Sheet 3
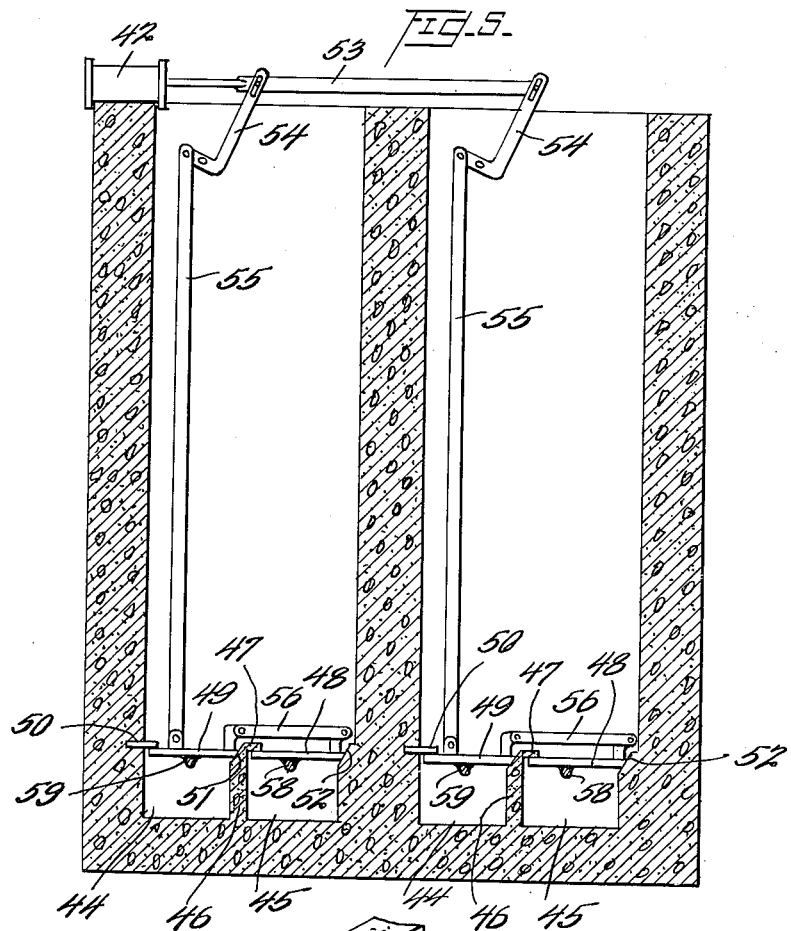
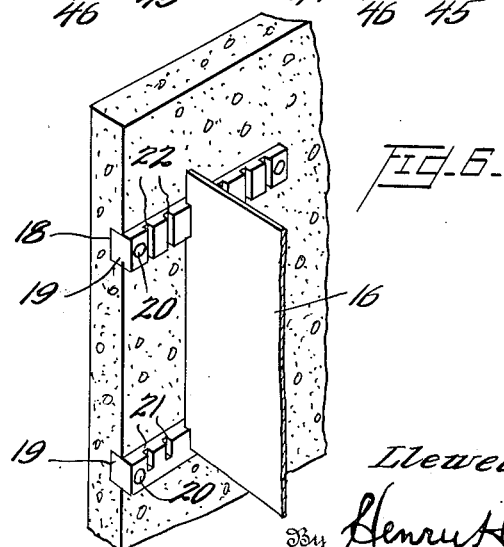
Inventor
Llewellyn B. Griffith
By Henry H. Snelling
Attorney Patented Nov. 20, 1945

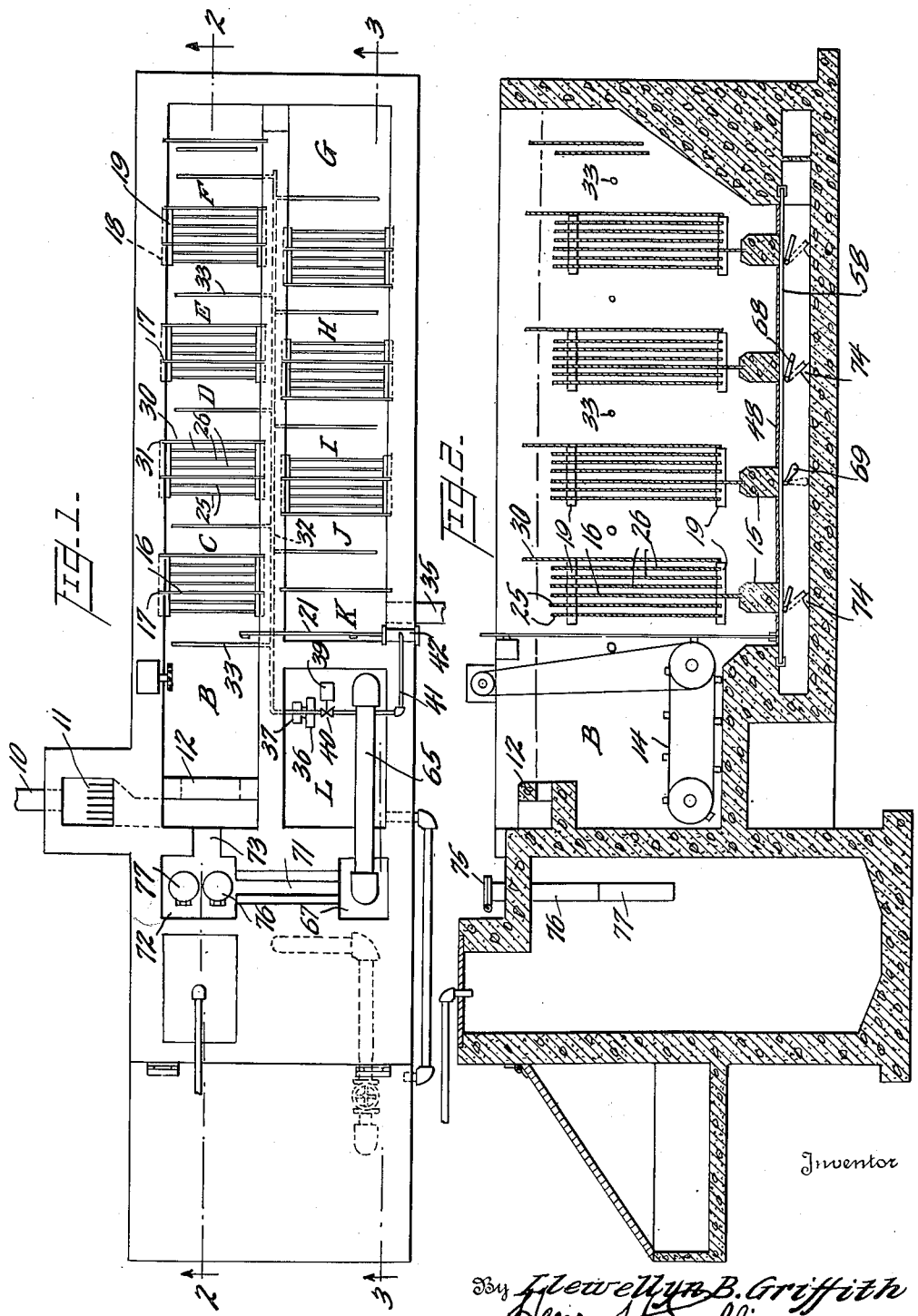

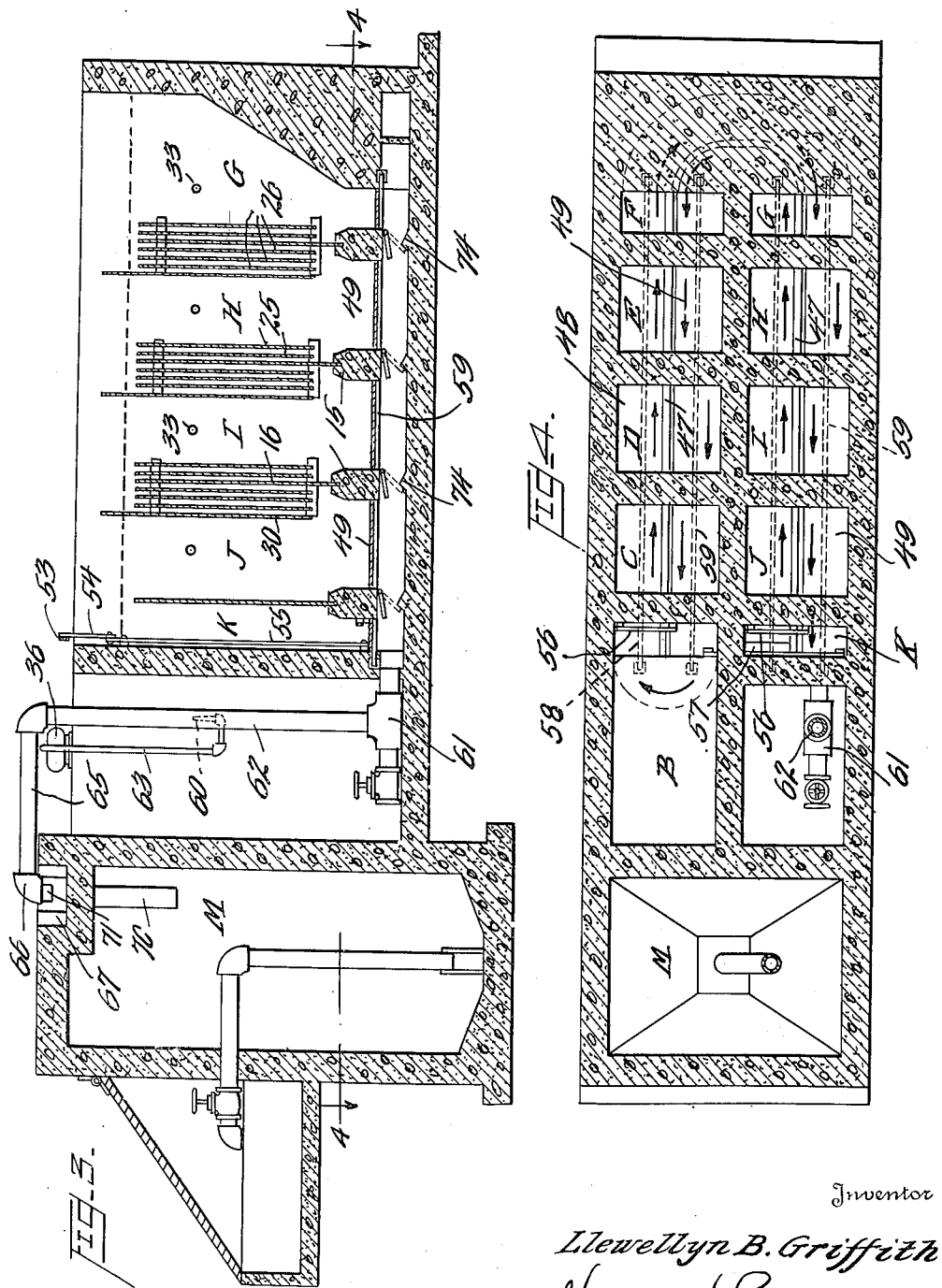

2,389,357

UNITED STATES PATENT OFFICE 2,389,357

SYSTEM OF SEWAGE CLARIFICATION AND SLUDGE REMOVAL

Llewellyn Brooks Griffith, Austin, Tex.

Application January 15, 1942, Serial No. 426,906

19 Claims. (Cl. 210—8)

This invention relates to sewage purification and has for its principal object the provision of a sewage system which, while useful for purifying large quantities of sewage, it is well suited for efficiently serving small isolated groups of residences without expert attendance.

An important object of the invention is to provide an automatic low-cost system which can be located on a small area close to habitations.

A further object of the invention is to provide a system of sewage purification which follows closely the stream action in nature. This is accomplished by cutting the initial settling chamber to about one-sixth of its usual size and discharging the sewage from this chamber through a succession of identical units in each cycle of which the sewage is aerated to freshen it, it is then gently mixed, and finally is discharged to the next cycle between a series of closely spaced parallel plates to provide a slow uniform flow to the next cycle.

A still further object of the invention is the provision of a sewage purification system in which each of the many tanks can simultaneously be cleared of its settled sludge without appreciable interference with the process.

Other objects of the invention relate to specific details as more fully pointed out in the following claims.

A vast number of residences and some few industries dispose of their sewage by septic tanks and other processes which accomplish so little purification in many cases that serious health hazards have resulted. Large systems where plenty of space is available are highly efficient, but none of the systems when altered for small installations are perfectly satisfactory, usually because these older systems require constant supervision by highly skilled operators.

An important feature of the present invention is that there is practically no loss of head through the system and the flow which has been rendered especially steady is provided by a series of simple air lifts, thus rendering the use of a pump unnecessary and making it possible to operate the plant automatically as by a simple time-controlled mechanism for passing the sludge to the digester at the chosen intervals.

In the drawings:

Figure 1 is a plan view.

Figure 2 is a vertical section taken on line 2—2 of Figure 1.

Figure 3 is a similar section taken on line 3—3 of Figure 1.

Figure 4 is a horizontal section taken on line 4—4 of Figure 3.

Figure 5 is a vertical section showing the trap door mechanism.

Figure 6 is a perspective view showing the flow control plates.

The raw sewage enters the plant through pipe 10, passing through a conventional bar screen 11 to a shelf discharge 12 through which the sewage passes to a settling chamber B, novel in that it is of a much smaller size than would ordinarily be expected as I find that almost 90% of the settable solids are removed in the first half-hour and only half of the remaining 10% is removed during the following half-hour whereas the last 5% requires an additional two hours or four times as long to remove as will eliminate 90% of the solids which can be settled out. Since in the present process this short period (half-hour) primary settling is followed by settling in a series of settling tanks, the removal of practically 90% of the settable solids during the first half-hour is sufficient and this enables me to use a primary settling tank which is less than one-fourth of the conventional size, thus giving me an obvious saving in first costs.

If the capacity of the system is of sufficient size to warrant it I may use a conventional type sludge scraper 14 in the settling chamber but I find this unnecessary with installations of the size illustrated in the drawings. The particular plant illustrated chosen because of its simplicity occupies a space of 5' x 17' and has a daily capacity to serve about three dozen people or 3500 gallons of domestic sewage.

The primary settling tank B discharges to an elongated sewage channel the walls of which are preferably perpendicular, giving a cross section much deeper than it is wide. The channel as illustrated in Figure 1 turns at its right end and then extends in opposite direction, to the sludge receiving tank L. Within this channel are located a series of identical units. The channel is primarily divided into tanks by means of sills 15, each carrying a submerged weir plate 16, anchored in the sill and held in the wall of the sewage channel by grooves 17, preformed in the concrete walls of the channel. The submerged weir plates 16 are grouted in these grooves 17 and thus the tanks form separate cells but are in communication with each other since the top of the weir plate 16 is always below the liquid surface.

On the two sides of each weir plate 16 which forms the front or the rear wall of a tank, a horizontal groove 18 is formed in the concrete wall of the sewage channel. In these grooves 18 timbers 19 are anchored as by the bolts 20, as best seen in Figure 6. The bottom timber 19 is notched as at 21 while the upper timber is slotted as at 22. In these slots and notches are received mixing plates 25 and flow plates 26, which need not and preferably do not extend from side to side of the channel. Their tops are alined with the weir plates and therefore are appreciably below the liquid surface and their bottoms are alined with baffle plates 30. The latter, however, do extend from side to side of the channel and are grouted in place in vertical grooves 31 in the concrete walls of the sewage channel. The baffle plates extend well above the liquid surface in the channel and form the end plates of the unit each of which includes as one of its plates the division plate or weir plate 16 which form the ends of the tanks.

An air main 32 is located in the wall between the two legs of the channel and discharges air into each of the tank through horizontally arranged branch air pipes 33, located about centrally of each tank in the upper half of the tank. It is preferable to locate these air diffuser pipes 33 at least about a foot below the liquid surface and approximately six inches in front of the adjacent mixing plate 25.

The action within each tank may best be understood by describing the units rather than the tanks, each unit being illustrated as consisting of an air pipe 33, two mixing plates 25, one division or weir plate 16, three flow plates 26 and finally one baffle plate 30. Although the drawing shows the weir plates 16 and the baffle plates 30 as slightly heavier than the partitions or plates 25 and 26, this is for clearness of illustration and I may and usually do employ the readily available cement asbestos flex boards for all of these partitions as I avoid hydrostatic pressure in a way later to be described.

The air discharged through pipe 33 causes a turbulence at the near water surface of the sewage, because of this air lift action, rises toward the adjacent plate or partition 25. All of the plates or partitions are equally spaced apart, my preference being for two inches, although I can place them as close together as one inch and might even space them as far as three inches. The greater part of the liquid flows down the two paths, defined by the two mixing partitions 25 and the weir plate 16, while a much smaller quantity passes over the top of weir plate 16.

Within any one tank, at the right-hand side thereof as seen in Figure 2 or the left-hand side as seen in Figure 3, the sewage is constantly rotating in vertical planes and the portion which passes over the weir plate is divided into four equal and narrow paths which insures a steady flow through the system as is obvious when we remember that if there were any tendency to increase velocity between two of the flow plates 26 or between them and the plates 16 or 30, there would result immediately a resisting friction which, as well known, is proportionate to the square of the increased velocity. The natural consequence is that the flow through each of the four paths is exactly the same as the flow through the other three.

Because the final partition of each unit, which is the baffle plate 30, extends above the liquid surface, the flow adjacent the three flow plates 26 is always downward and this discharges the sewage near the bottom of the channel where it rises under the influence of the air discharge pipe of the next unit.

Considering the same operation as limited to a single tank or cell, the sewage flows downwardly between the flow plates 26 and the left-hand or rear weir plate 16 and rises to the center of the tank almost entirely on the left-hand side of the air pipe 33 in Figure 2. Here the flowing stream meets the stream in the tank which is being circulated between the mixing plates 25 and the front weir plate 16. A small portion of the mixed flow passes to the next tank but the major portion is repeatedly circulated in the tank to further the stabilization of the sewage with consequent rapid settling out of the solids.

In order to conserve space the sewage channel and sludge channel beneath it form a U as seen at the right end of Figure 1, the initial settling chamber B and tanks C, D, E and F being in one stage or leg. G is a transition chamber having but two pairs of baffle plates in it whereas H, I and J are chambers of the normal type. Chamber K as illustrated in Figures 1 and 3 is a final chamber and is free from baffle plates and air pipes. The sewage effluent pipe 35 leads from this chamber at an elevation not to interfere with the sludge releasing mechanism.

Referring particularly to Figures 1 and 5, the blower 36 preferably of the centrifugal type is driven by motor 37 and feeds air to the main air pipe 32 and its nine branch pipes. I prefer that the sludge discharge be not constant. The intermittent action is provided by a clock mechanism 39 which also controls a valve 40 leading through branch line 41 to the cylinder 42 which operates at chosen intervals the sludge removing trap doors which allow the sludge to pass from sewage channel above to the sludge channel below. The specific mechanism is illustrated in Figure 5.

It is my preference to divide each sludge channel into two approximately even portions 44 and 45 by any chosen means as for example the longitudinal riser 46, which has a stop 47 at its upper portion to form a seat for the right-hand trap door 48 as seen in Figure 5. The similar trap door 49 over the sludge channel 44 likewise has a stop formed by the rail 50. Although this stop may be omitted I find it highly desirable as I prefer to have a rather complete closure by means of the trap door or trap doors. For this reason I bevel the surface 51 of the center partition and I likewise bevel the wall side as at 52. Obviously a single trap door could be used by the simple provision of a hopper bottom to the tank but this would cut the length of travel in half which I prefer not to do.

Beneath each sill 15 is a one way valve 68 or a hinged gate 69 either of which will prevent flow in either direction between the bottoms of adjacent tanks when the difference in liquid levels is less than a chosen amount, for example one foot, and will allow flow in the forward direction only when the difference in head exceeds such amount, as it would when the air lift 69 is in operation. Where the valve is a mere gate as at 69 its weight is made sufficient to bar flow when the difference in head is small. Where the valve is lighter as at 68 I prefer to provide a stop 74 as an integral portion of the concrete bed of the channel. This naturally prevents reverse flow under any conditions.

The cylinder 42 operates a link 53 pivoted to two bell crank levers 54, from the short arm of each of which is pivoted a link 55, pivoted at its bottom to the trap door 49 which in turn is connected to the adjacent trap door 48 by a link 56. Hence, by admitting air to the cylinder 42, two trap doors are simultaneously operated and since the entire sets of doors are fast to the shafts 58 and 59, each and all of the tanks are simultaneously opened. This action is important and is a great improvement over the previous method of emptying the tanks one at a time, usually by hand. The doors are normally open and are closed only while the sludge is being withdrawn.

The action is probably best seen in Figure 4. The flow of sludge starts from chamber K which on the far side is open at all times to the sludge chamber as at 57. Tank K would contain the least amount of sludge, practically none in actual operation unless the plant was working over normal capacity. The flow as caused by an air lift 60, a pump, or by gravity, follows the direction of the arrows and reverses its flow as later described, returning in reverse order through the various tanks to the near sludge chamber beneath final tank K and which communicates through T 61 with a single vertical pipe 62 having therein the air lift 60 fed from blower 36 through pipe 63 controlled as previously mentioned by the time mechanism 39. The air lift continues until the entire sludge chamber is filled with water, at which time the trap doors reopen.

The air life pipe 62 discharges horizontally as as 65, through an L 66 to the receiving chamber 67 in the upper portion of the sludge digester and having its bottom slightly above the liquid level in the digester M. A space is provided between the L 66 and the bottom of the chamber 67 in order to release air to the atmosphere. Normally the raw sludge passing through pipe 62 to the digester all flows through an intake pipe 70. In case, however, the digester is filled, the raw sludge will pass slowly to the digester and this will cause a partial filling of chamber 67 with consequent return of the excess water through channel 71, at a higher elevation than the bottom of chamber 67 to basin 72 which feeds through passage 73 to the initial settling chamber.

For reasons I cannot fully explain it is difficult to determine to what depth the overflow pipe from the sludge digester shall extend. From a practical standpoint I have had excellent results with two pipes substantially parallel, both feeding through a flap cover 75 to the basin 72. The pipe 76 is much shorter than the pipe 77, hence when the sludge digester does overflow I can select which of the two pipes to permit to discharge into basin 72, as for example by the simple expedient of placing a brick on the hinged cover 75 on the digester overflow pipe which has the most objectionable discharge.

The operation of the device is as follows: The raw sewage flows through pipe 10, and the conventional bar screen 11 which removes sticks, rocks, rags, etc., to the shelf 12 which distributes the entering sewage rather evenly throughout the initial settling tank B which is so constituted as to require a detention of the sewage for only about a half-hour. An air lift created by discharge from the pipe 33 in tank B aerates the sewage and causes its mixing at the right-hand end of the tank as seen in Figure 2. As this sewage is constantly mixed by repeated flow between the wide plates 25—25—16, a portion of it passes over the plate 16 which is a submerged weir plate defining the forward end of tank B.

The final plate of the set or unit is a baffle plate 30 extending well above the liquid surface. Such sewage therefore as passes over the submerged weir plate 16 will be divided equally into four channels as defined by the plates 16, 26, 26, 26, 30 causing a very steady flow under the baffle plate 30 to the next cycle. This cycle is repeated in the successive tanks. The cycle and the tank are not co-extensive, the former extending from pipe 33 to pipe 33 while the latter is bounded at each end by a weir plate 16 and its sill 15. From final tank K the treated sewage effluent is discharged through pipe 35.

From time to time it becomes necessary to remove the sludge which falls to the bottom of each tank between its sills 15 as a result of the stabilizing action of the entering air, the quantity and location of entry of which is such that further air is added just prior to putrefaction. By virtue of this feeding of air to the sewage, septic action is checked and the sewage becomes stabilized during the next subsequent slow mixing. While the sewage is thus being re-circulated through the mixing step the sewage particles coagulate into flocculi which in coagulating form masses or floccules, more frequently specified as a flock and more recently a "floc." The flocculation permits a more rapid settling velocity for the suspended solids which are thus oxidized and it also purifies the stream by the adhering and collective settling of the colloidal solid particles and other particles so fine that they would otherwise settle in an abnormally slow time.

From time to time the sludge is drawn from the bottom of the several tanks by a simultaneous opening of the pivot trap doors 48. The amount of opening can be varied by altering the amount of air delivered to the cylinder 42. Simultaneously with the opening of the trap doors which form the false bottom of the sewage channel, air is directed to nozzle 60 and this withdraws the sludge from all of the compartments. The trap doors preferably are closed before the air lift completes its action.

What I claim is:

1. In a sewage purification stream, a channel, submerged transverse weir plates separating the channel into a plurality of tanks, a plurality of baffle plates in said channel, one baffle plate in each tank, extending above the liquid surface and leaving an open space at the bottom of the channel, a plurality of partitions in each tank on both sides of said baffle plate, and means for discharging air in each tank near the liquid surface in a direction to cause a portion of the sewage to pass over a submerged weir plate to the next successive tank, said means being out of vertical alinement with the partitions and plates.

2. In a sewage purification system, a channel means dividing it into a plurality of communicating tanks, a sludge channel below said tanks, a trap door at the bottom of each tank for passing settled sludge to the sludge channel and means for simultaneously closing all of said trap doors and further means for withdrawing sludge from said sludge channel when all of said tanks are closed from said sludge channel by said trap doors, whereby the sludge removal takes place without direct flow from the tanks to the sludge channel, thus minimizing dilution of the sludge.

3. In a sewage purification system, the method of treating the sewage by a series of identical steps each including mixing, steadying the rate of flow in each step by passing the sewage in a plurality of parallel paths each of the same crosssectional area, and aeration to check septic action and to cause the sewage to flow to the next cycle, trapping from the series the sludge settling in each step and simultaneously withdrawing all of said sludge, while so trapped, whereby to minimize dilution of the trapped sludge.

4. In a sewage purification system, a sewage channel, means dividing the channel into a plurality of tanks, a sludge channel extending beneath said tanks, normally open means in each tank which may be closed to separate the sewage channel above from the sludge channel below and means for simultaneous closing communication between each of the tanks and the sludge channel and withdrawing the sludge from the sludge channel, whereby to minimize dilution of the sludge.

5. In a sewage purification system, a sewage channel, means dividing the channel into a plurality of tanks, a sludge channel extending beneath said tanks, normally open means in each tank which may be closed to separate the sewage channel above from the sludge channel below, valves in the sludge channel under the dividing means, said valves, when the normally open means are open, allowing free flow under chosen difference of heads from any one tank to the next tank in one direction, while preventing flow in the opposite direction and in said one direction in absence of said difference in head.

6. In a system of sewage purification, the step of repeatedly injecting air in small quantities to the flowing sewage stream at spaced points and at spaced intervals of time, each injection of air being but slightly prior to the start of septic action in the sewage, whereby the organic matter in the sewage is fed air at such a rate as to prevent putrefaction and subsequent discharge of gas which would hinder settling of the flocculated mass due to lightening it by the gas bubbles formed during putrefaction.

7. A cell or tank in a sewage plant comprising two side walls, a front wall over the top of which the sewage flows into the cell, and a back wall over the top of which the sewage flows from the cell, a series of closely spaced plates parallel to the front wall, the end one of which extends above the liquid level, a plurality of closely spaced submerged plates adjacent the rear wall and spaced away from the nearest plate of said series to form a central aeration chamber within the cell, and an air discharge in the upper half of the tank in said aeration chamber and below the liquid surface.

8. The device of claim 7, including a false bottom, well below the bottoms of the plates, through which sludge settling out in the tank may be discharged.

9. In a sewage system channel, a weir plate transverse of the channel, an aerating device upstream of the weir plate, means between the device and the plate for dividing the flowing parallel stream into a plurality of streams of equal width and thickness to insure a slow, steady flow.

10. In a sewage system channel, a weir plate transverse of the channel, an aerating device downstream of the weir plate, means between the device and the plate for dividing the flowing parallel stream into a plurality of streams of equal width and thickness to insure a steady flow.

11. In a sewage system channel, a weir plate transverse of the channel, an aerating device downstream of the weir plate, means between the device and the plate for dividing the flowing stream into a plurality of streams of equal width and depth to insure a steady flow, and a baffle plate extending well above the liquid level to insure that substantially the entire flow passes downward after flowing over the weir plate.

12. In a sewage system, an elongated sedimentation tank including an entrance compartment, an exit compartment, and an intermediate compartment, a series of units in said intermediate compartment each including a transverse sill, a submerged weir plate rising from the sill to a point short of the liquid level of the tank, a plurality of plates spaced from the weir plate on the upstream side, a plurality of plates on the downstream side, and a baffle plate adjacent the latter plates and extending above the liquid level of the tank, said plates being parallel and spaced apart not less than about an inch, nor more than about three inches, and means for moving the liquid from the entrance compartment to the exit compartment, whereby the upstream plates will divide the liquid into a plurality of downward moving streams and the downstream plates will divide the liquid into a plurality of downstream moving streams.

13. The device of claim 12 in which the plates are equi-spaced whereby to insure a steady flow through the system by insuring an equal velocity through the several paths or streams.

14. The device of claim 2 in which the sludge channel is divided centrally into two sections, and means for causing a flow in opposite directions in the two sections.

15. In a sewage plant, a sewage channel, a sludge channel beneath the sewage channel, a plurality of normally open bottoms, means to close the bottoms to separate the channels, a longitudinal partition dividing the sludge channel into two sections, a chamber at one end of the channel joining the sections, and means for withdrawing sludge from one section at the other end of the channel, whereby to cause a reverse flow thru the two sections of the sludge channel so that minimum dilution of the sludge is secured when the sludge is withdrawn while the bottoms are closed, and the sludge channel is filled with relatively clear sewage before the bottoms are again opened.

16. The device of claim 15 in which the sewage channel is divided by transverse, vertical walls into a plurality of tanks and the sludge channel is divided similarly by one-way valves beneath the vertical walls, whereby to allow flow from one tank to the proximate down-stream tank thru the sludge channel and the open bottoms in case of excessive difference in heads on the two tanks.

17. A unit in a sewage channel consisting of a sill, a weir plate extending upward from the sill to a line below the height to which the sewage rises when the channel is in use, a baffle plate short of the bottom and rising above said height, and a plurality of wide plates equally spaced on both sides of the weir plate short of the bottom and said height, and means for causing a downward flow thru all of the paths defined by the several plates, proximate weir plates and their sills defining the tanks into which the channel is divided.

18. A sludge channel, U-shaped in plan, means dividing the channel longitudinally into adjacent sections, and means for joining one end of each section to the end of an adjacent section to form a continuous closed path for the sludge, whereby feeding of sludge into the channel and removal of sludge from one end of said path will cause a flow thru all of the sections.

19. The channel of claim 18 in which the sections are two in number and parallel, the top of the sludge channel is formed by a series of spaced trap-doors, there is a valve in the channel between proximate trap-doors to close the sludge channel and to prevent reverse flow in the channel, the joining means connects the two sections at one end of the U, and both the entrance and the exit to the sludge path are at the other end of the U.

LLEWELLYN B. GRIFFITH.